United States Patent [19]

Kunishge

[11] Patent Number: 5,311,242
[45] Date of Patent: May 10, 1994

[54] AUTOFOCUS CAMERA AND METHOD OF FOCUS CONTROL THEREFOR

[75] Inventor: Keiji Kunishge, Tokyo, Japan
[73] Assignee: Olympus Optical Co., Ltd., Tokyo, Japan
[21] Appl. No.: 14,098
[22] Filed: Feb. 5, 1993

Related U.S. Application Data

[63] Continuation-in-part of Ser. No. 867,769, Apr. 13, 1992, abandoned.

[30] Foreign Application Priority Data

May 16, 1991 [JP] Japan .................. 3-111888

[51] Int. Cl.$^5$ .................................. G03B 13/36
[52] U.S. Cl. .................................. 354/403
[58] Field of Search .................. 354/403, 408

[56] References Cited

U.S. PATENT DOCUMENTS

| 5,136,148 | 8/1992 | Nonaka | 354/403 X |
| 5,216,460 | 6/1993 | Yoshimura et al. | 354/403 X |
| 5,255,045 | 10/1993 | Nonaka | 354/403 |

FOREIGN PATENT DOCUMENTS 63-118133 5/1988 Japan .
63-159817 7/1988 Japan .
1-150809 6/1989 Japan .

*Primary Examiner*—W. B. Perkey
*Attorney, Agent, or Firm*—Frishauf, Holtz, Goodman & Woodward

[57] ABSTRACT

An autofocus camera includes a photographing lens which is electrically driven. A range finding unit emits a pulse beam to an object and receives a reflection beam from the object, thereby outputting a signal representing the distance between the range finding unit and the object. A first range finding operation control unit responds to half-depression of a release button, and activates the range finding unit to obtain a first range output. A first drive control unit responds to full-depression of the release button, and drives the photographing lens on the basis of the first range output from the first range finding operation control means, thus performing a first lens driving operation. A second range finding operation control units activates the range finding unit to obtain a second range output either before or after the first lens driving operation is completed. A timer measures a time interval between the time point of the first range finding operation and the time point of the second range finding operation, thereby outputting count time data. A second drive control unit estimates the distance to the object at the time of operating a shutter, on the basis of the first range output and second range output and the count time data, and re-driving the photographing lens.

18 Claims, 16 Drawing Sheets

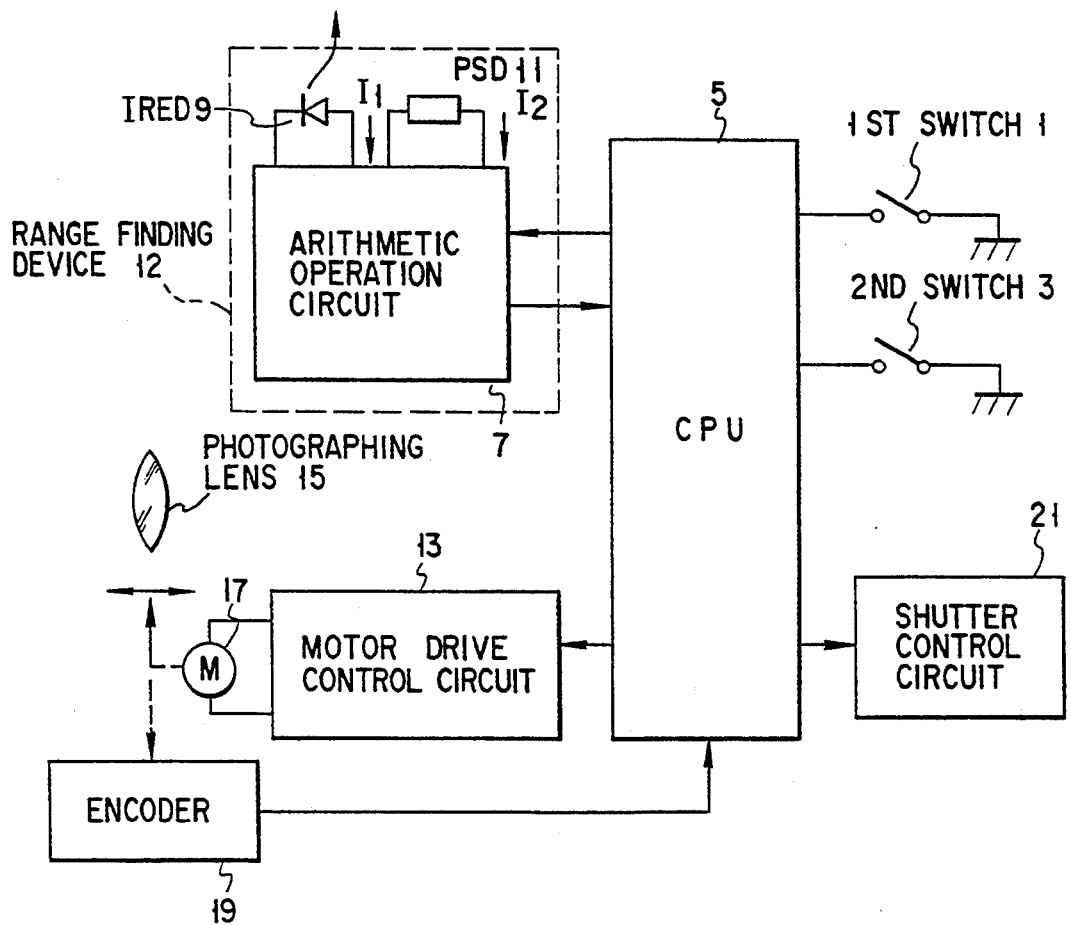
F I G. 1

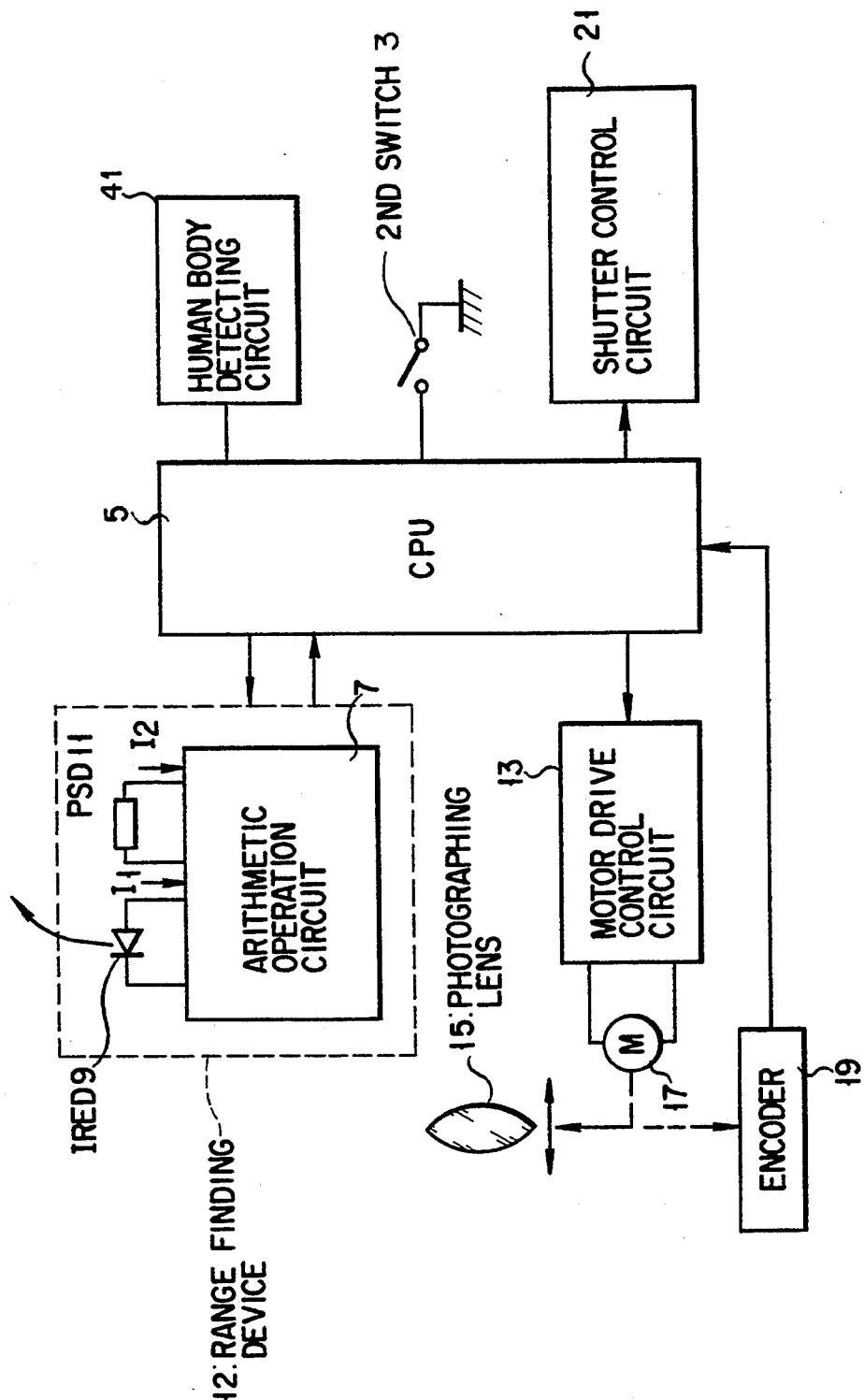
F I G. 7

AUTOFOCUS CAMERA AND METHOD OF FOCUS CONTROL THEREFOR

This application is a continuation-in-part of application Ser. No. 07/867,769, filed Apr. 13, 1992, now abandoned.

BACKGROUND OF THE INVENTION

1. Field of the Invention

The present invention relates to an autofocus camera wherein a photographing lens is driven on the basis of an output from a range finding device, and to a method of focus control therefor.

2. Description of the Related Art

In a camera having an autofocusing mechanism, a large time lag occurs between the time point of shutter release and the start of exposure. Consequently, when an object moving along the optical axis of the camera is to be photographed, a photographing lens may not be correctly focused.

Techniques for solving this problem are disclosed in Published Unexamined Japanese Patent Application (PUJPA) No. 63-118133 and PUJPA No. 63-159817. According to these techniques, the velocity of an object is detected and the position of the object at the time of exposure is determined in advance, thereby driving the photographing lens. Specifically, on the basis of the distance detected at the first time point and the distance detected at the second time point (a predetermined time after the first time point), the velocity of the object is calculated.

However, according to the technique of PUJPA No. 63-159817 wherein complex calculation is performed to find the distance of the object and thereafter the lens is driven, the release time lag (calculation time+time required for driving the lens+time for starting the shutter operation) increases and the best chance for releasing the shutter may be missed.

Suppose that the time required for finding the amount of movement of the object is 10 msec. and the release time lag is 400 msec. In this case, on the basis of the amount of movement of the object during 10 msec., the distance from the camera to the object (hereinafter called "object distance") at the time point of exposure start after 400 msec is estimated. More specifically, the error in velocity of the object is increased 40 times, and the possibility of defocusing becomes higher in such a range finding device as an active triangular range finding device with a high error in distance found. If the time required for measuring the amount of movement of the object is increased to reduce the error, the time lag increases further and the chance for releasing the shutter may be missed.

SUMMARY OF THE INVENTION

An object of the present invention is to provide an autofocus camera wherein the effect of correction for a moving object can be enhanced by reducing a time lag at the time of the correction, whereby the chance for a shutter is not missed, and to a method of focus control.

In order to achieve this object, according to an aspect of the invention, there is provided an autofocus camera comprising:

a photographing lens which is electrically driven;

range finding means for emitting a pulse beam to an object and receiving a reflection beam from the object, thereby outputting a signal representing the distance to the object;

first range finding operation control means responding to half-depression of a release button, and activating the range finding means to obtain a first range output;

first drive control means responding to full-depression of the release button, and driving the photographing lens on the basis of the first range output from the first range finding operation control means, thus performing a first lens driving operation;

second range finding operation control means for activating the range finding means to obtain a second range output either before or after the first lens driving operation by the first drive control means is completed;

timer means for measuring a time interval between the time point of the first range finding operation by the range finding means and the time point of the second range finding operation by the range finding means, thereby outputting count time data; and second drive control means for estimating the distance between the range finding means and the object at the time of operating a shutter, on the basis of the first range output and second range output from the range finding means and the count time data from the timer means, and re-driving the photographing lens.

According to another aspect of the invention, there is provided a method of controlling the focus in a camera, comprising the steps of:

performing a first range finding operation in response to depressing of a shutter release button;

initially driving a photographing lens on the basis of the result of the first range finding operation;

performing a second range finding operation either just after or just before the initial driving of the photographing lens is completed;

estimating the distance to an object at the time of operating a shutter, on the basis of the result of the first range finding operation, the result of the second range finding operation and the time interval between the first and second range finding operations; and re-driving the photographing lens in accordance with the estimated distance.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 shows the structure of an embodiment of the present invention;

FIG. 7 shows the structure of another embodiment of the present invention;

DETAILED DESCRIPTION OF THE PREFERRED EMBODIMENTS

Figure 2:
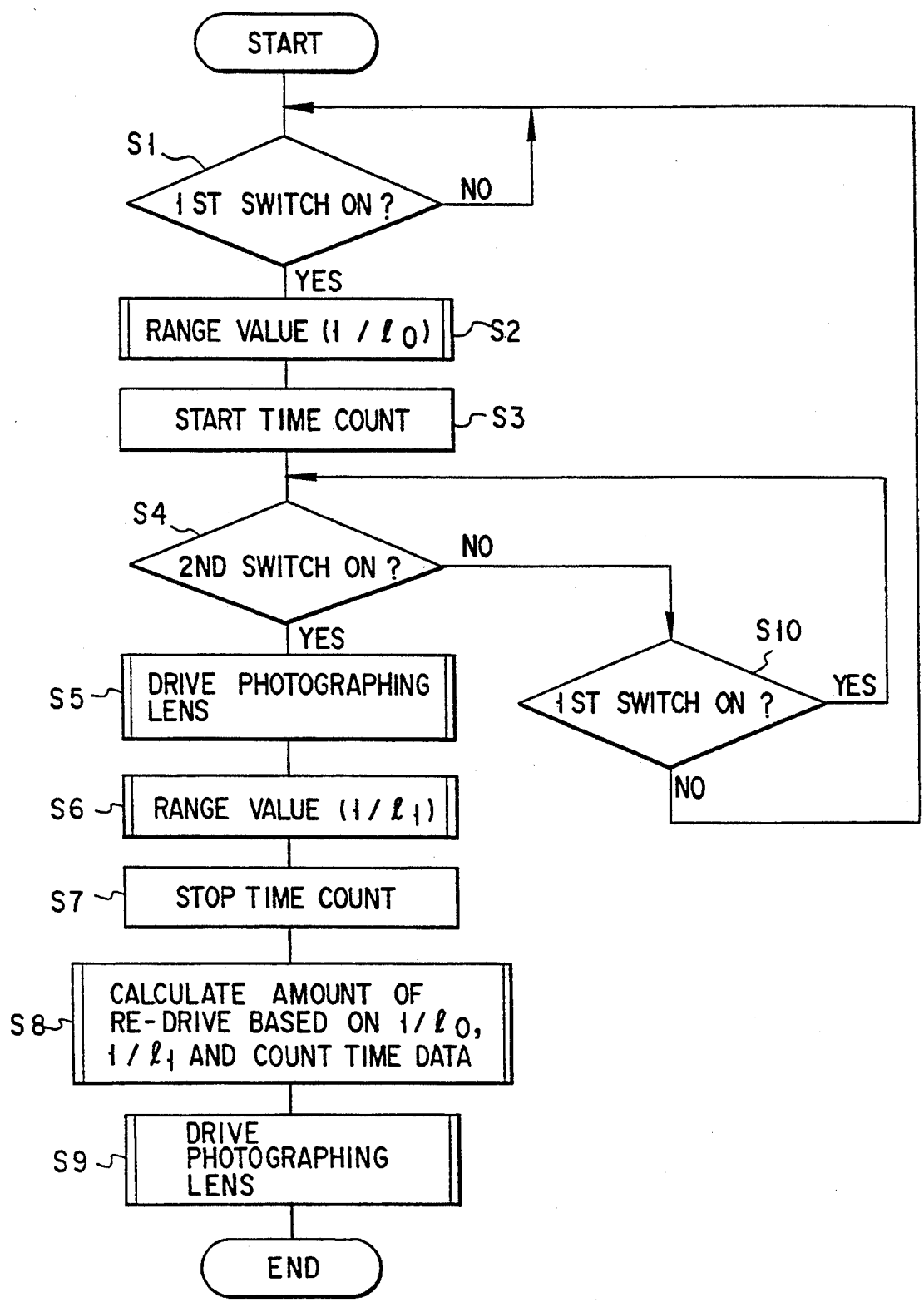
FIG. 2 is a flow chart for explaining the operation of the embodiment shown in FIG. 2.
Figure 3:
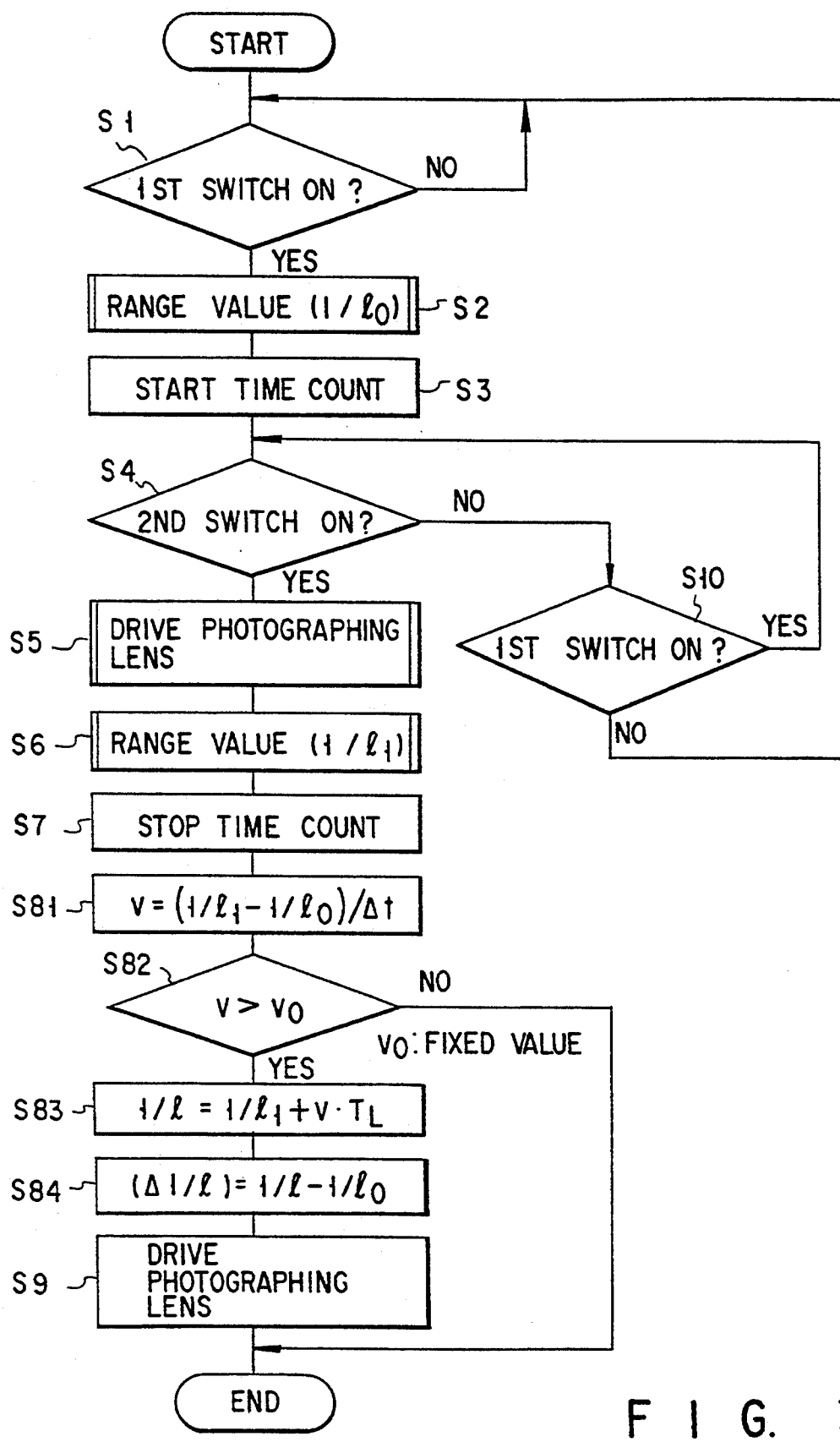
FIG. 3 is a flow chart for illustrating a modification of the embodiment shown in FIG. 2.

FIG. 1 shows the structure of an embodiment of the present invention, and FIGS. 2 and 3 are flow charts for illustrating the operation of this embodiment.

A first switch 1 is turned on by half depressing a release button, and a second switch 3 is turned on by fully depressing the release button.

When the first switch 1 is turned on, a CPU 5 activates a range finding device 12 and lights an infrared-emission diode (IRED) 9 connected to an arithmetic operation circuit 7 in a pulsating manner. A position sensitive detector (PSD) 11, as is well known, varies signals I1 and I2 in accordance with the position of incidence light, and the output from the arithmetic operation circuit 7 is input to the CPU 5. When the second switch 3 is turned on, a motor drive control circuit 13 initially drives a photographing lens driving motor 17 in accordance with the output from the CPU 5, which output corresponds to the output from the arithmetic operation circuit 7.

As is conventionally know, a photographing lens 15 is connected to an encoder 19, and the amount of motion of the lens 15 is encoded and a corresponding encoder pulse is fed back to the CPU 5. Receiving the encoder pulse, the CPU 5 moves the lens 15 by a necessary amount and outputs a stop signal to the motor drive control circuit 13. At this time, the CPU 5 outputs a brake signal to the motor drive control circuit 13 just before the lens is placed at the stop position, thereby enhancing the precision of the lens stop position. The structure for this is well known, and a detailed description is omitted.

When the initial movement of the photographing lens 15 by means of the motor 17 is stopped, the CPU 5 lights the IRED 9 once again and enables the range finding operation and driving of the lens once again.

The CPU 5 includes count means for counting the time between the range finding operation at the time the first switch 1 is turned on and the next range finding operation at the time the photographing lens 15 is stopped.

When the re-driving of the lens 15 is completed, a shutter control circuit 21 opens the shutter.

The operation of the embodiment of FIG. 1 will now be described in greater detail with reference to the flow chart of FIG. 2. In step S1, camera control means including the CPU 5 and arithmetic operation circuit 7 examines the condition of the first switch 1. When the first switch 1 is in the OFF state, the camera control means stands by. When the first switch 1 is turned on, the CPU 5 enables the range finding device 12 and lights the IRED 9 immediately. Thus, the first range finding operation is performed. Thereby, a first range value $1/l_0$ is obtained (step S2).

The circuit configuration and specific operation of the range finding device 12 are described in detail in PUJPA No. 1-150809. The obtained range value is stored in a memory M(0) (not shown).

In step S3, the timer means in the CPU 5 starts time count. Subsequently, the state of the second switch 3 is examined (step S4). If the second switch 3 is in the ON state, the control routine advances to step S5. If it is in the OFF state, the control routine advances to step S10. In step S10, the state of the first switch 1 is checked once again. If the first switch 1 is turned on, the control routine returns to step S4, and if it is in the OFF state, the control routine goes back to step 1.

In step S5, the photographing lens 15 is initially driven on the basis of the first range value $1/l_0$. In usual cases, 300 msec. are required for driving the lens 15, and this occupies most of the time lag in the autofocus camera.

In step S6, when the initial driving of the photographing lens 15 is completed, the IRED 9 is lighted once again and the range finding operation is performed, thus obtaining a second range value $1/l_1$. This second range value is stored in a memory M(1) (not shown).

In step S7, when the range finding operation is completed, the time count in step S3 is simultaneously stopped. And the timer means outputs a time count value (time count data) $\Delta t$ representing the time between the first and second range finding operations. In usual cases, since the amount of movement of the lens 15 varies in accordance with the object distance, the velocity of the object can exactly be found on the basis of the count time.

In step S8, the velocity of the object is found on the basis of the range values $1/l_0$ and $1/l_1$ and time count value $\Delta t$, and the amount of re-driving of the lens to the position at which the lens is to be focused is calculated by the following equation:

$$\Delta(1/l) = 1/l_1 + \{(1/l_1 - 1/l_0)/\Delta t\} \cdot T_L - 1/l_0$$
$$= (1/l_1 - 1/l_0)(1 + T_L/\Delta t)$$

wherein $T_L$ is the time lag caused up to the start of exposure including re-driving time, for example, a fixed value of 50 msec.

In step S9, the photographing lens 15 is re-driven on the basis of $\Delta(1/l)$ obtained in step S8.

In the above embodiment, if there is a difference between the first range value $1/l_0$ and the second range value $1/l_1$, the lens must be re-driven. However, if the difference is very slight, it can be determined that the object is within the depth of field of the lens, and the re-driving of the lens may not be performed.

Figure 4:
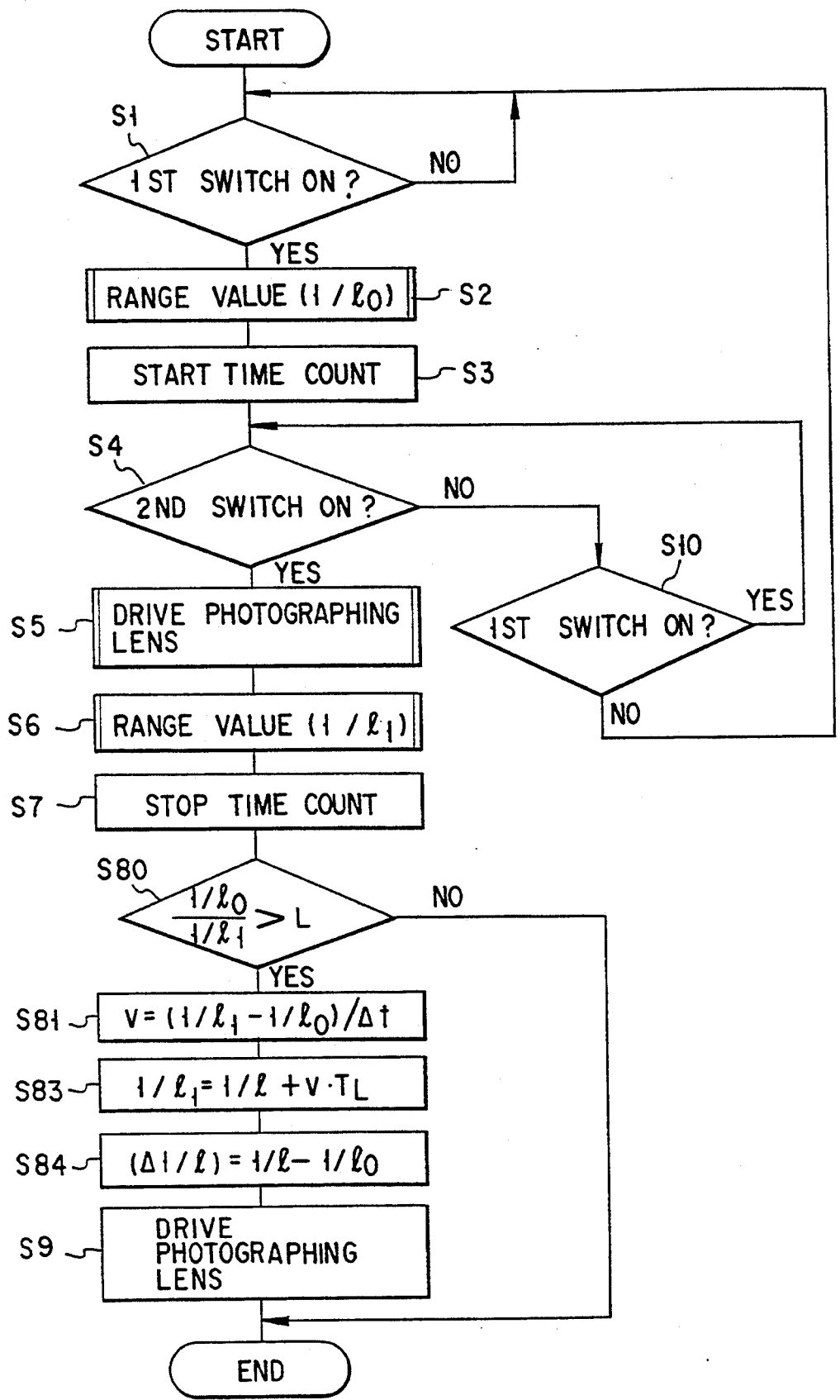
FIG. 4 is a flow chart for illustrating another modification of the embodiment shown in FIG. 2.

FIGS. 3 and 4 illustrate these alternative cases. In FIG. 3, steps S81, S83 and S84 correspond to step S8 in FIG. 2. New step S82 intervenes between steps S81 and S83, unlike FIG. 2. Specifically, in step S81, the velocity v of the object is found. In step 82, the velocity v is compared with a reference velocity v0. Only when the v is greater than v0, is the amount of re-drive for the lens found in steps S83 and S84, thereby re-driving the lens. When v is not greater than v0, the lens is not re-driven.

In FIG. 3, the velocity is compared with the reference value in step S82 to determine whether or not the lens should be re-driven. In this case, it is possible to directly compare the first range value $1/l_0$ and the second range value $1/l_1$ in order to determine whether or not the lens should be re-driven, as is illustrated in FIG. 4.

In FIG. 4, when the ratio of $1/l_0$ to $1/l_1$ is lower than a reference value L in step S80, the lens is not re-driven. Steps S81 to S84 correspond to step S8.

Figure 5:
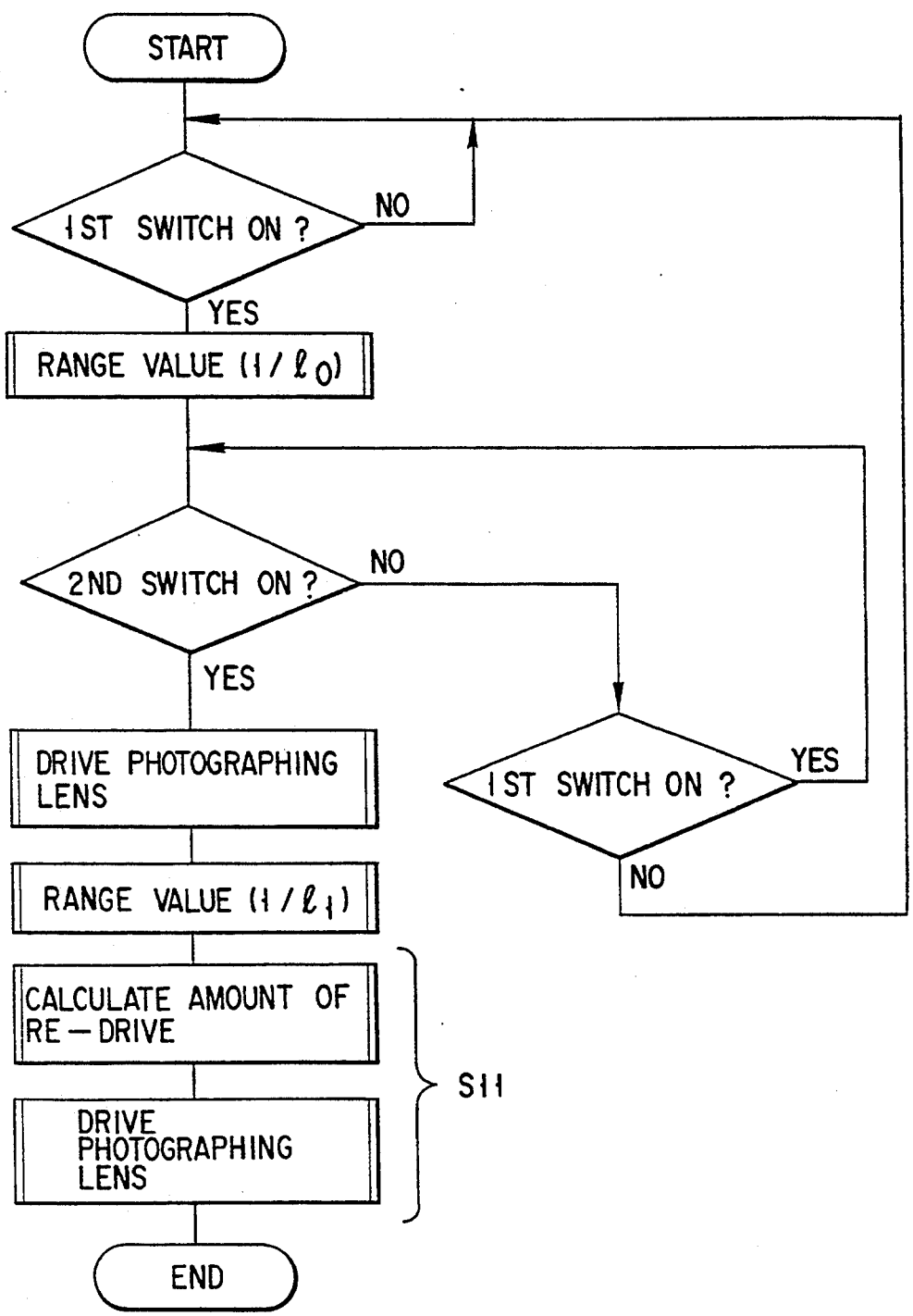
FIG. 5 is a flow chart for illustrating another embodiment of the invention.

FIG. 5 illustrate another embodiment of the invention. FIG. 5 is a flow chart illustrating the case in which $T_L/\Delta t < < 1$. Consideration is not given to $\Delta t$. At this time, the amount of re-drive is given by a simple subtraction, i.e. $\Delta(1/l) = (1/l_1 - 1/l_0)$. Thus, the arithmetic operation time required for the correction for the moving object is negligible.

In the embodiment of FIG. 5, if there is a difference between $l_0$ and $l_1$, the lens must be re-driven. However, for the same reason as has been stated in connection with FIGS. 2, 3 and 4, if the radio of $l_0$ to $l_1$ is lower than a predetermined value, the lens may not be re-driven. This will be illustrated in FIG. 6. In step S111, only when the radio of $l_0$ to $l_1$ is lower than a reference value L, is the lens driven by a predetermined amount in step S112.

If step S11 is incorporated in the braking time of the motor 17 for driving the photographic lens 15, step S11 becomes practically negligible. Normally, the braking time required is about 20 msec. to 50 msec. The processing of step S11 can be performed within this time, and the time lag can be decreased remarkably.

As has been described above, according to the above-described embodiments of the present invention, the time required for controlling the drive of the photographic lens intervenes between the first and second range finding operations for detecting the motion of the object, whereby the precision in detecting motion of the object can be enhanced without increasing the time lag. In addition, the effect of correction for the moving object can be enhanced without erroneous correction. Furthermore, the arithmetic operation time for correction for the moving object can be reduced to a minimum, and the chance for releasing the shutter is not missed.

In the embodiment shown in FIG. 7, a human body detecting circuit 41 is provided in place of the first switch 1 depicted in FIG. 1. The human body detecting circuit 41 detects whether or not the photographer is looking into the finder (see FIG. 8A); alternatively, the human body detecting circuit 41 detects whether or not the photographer holds the grip of the camera (see FIG. 10A). The second switch shown in FIG. 7 is a switch which is turned on when the release button of the camera is depressed.

Except for the human body detecting circuit 41 and the arrangement of the second switch, the structural components shown in FIG. 7 are similar to those shown in FIG. 1. Therefore, a detailed description of the common structural components shown in FIG. 7 will be omitted, and a description will be given of the elements shown in FIGS. 8A, 8B, 9 and 10A–10C.

Figure 9:
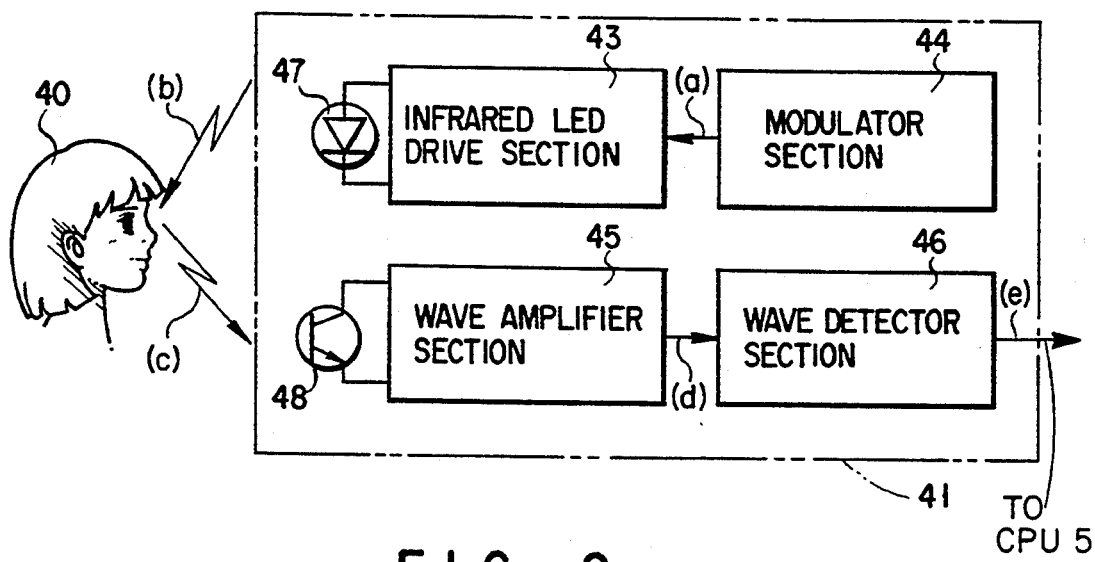
FIG. 9 shows an embodiment of the human body detecting circuit of FIG. 7.

FIG. 9 shows an embodiment of the human body detecting circuit of FIG. 7. The human body detecting circuit 41 comprises an infrared light-emitting system and an infrared light-receiving system. In the infrared light-emitting system, an infrared light emitting diode 47 is driven in response to an output from an infrared LED drive section and emits an infrared light beam. To prevent adverse effects arising from sun light or other bright ambient light, the infrared LED drive section 43 is modulated by a modulator section 44. The modulated infrared light beam emitted by the infrared light emitting diode 47 is first reflected by the human body 40 and is then incident on the infrared light-receiving system.

In the infrared light-receiving system, the infrared light beam is photo-electrically converted by a photo transistor 48. An electrical signal obtained by this photoelectric conversion is amplified by a cross-connection tape wave amplifier section 45, and only signal components corresponding to the modulated light beam emitted from LED 47 and reflected from the human body 40 are detected by a wave detector section 46. More specifically, light-receiving element (photo transistor) 48 receives not only the light beam emitted from LED 47 and reflected by human body 40, but also a variety of other light beams (e.g. the sunlight or other light reflected by the human body). However, if all of the light beams received are output as a signal, the object of the present invention cannot be attained. Therefore, a wave detector section 46 is designed to detect only signal components corresponding to the modulated light beam emitted from LED 47 and reflected by the human body 40, and to output a signal on the basis of the signal components (i.e., modulated reflected signal components) detected. The manner in which the human body detecting circuit 41 is arranged in the camera is shown in FIG. 8. FIGS. 17(a)–(e) show the signal waveforms at respective points (a)–(e) shown in FIG. 9.

Figure 8A:
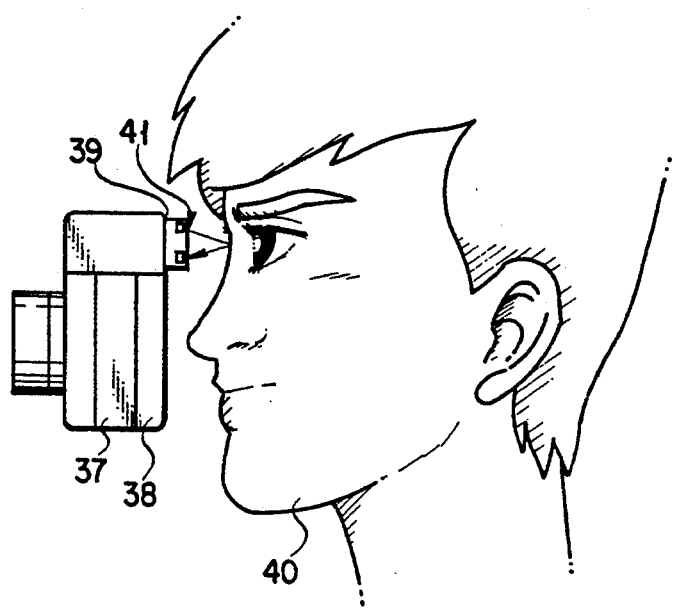
FIG. 8A shows a photographer looking into the finder of a camera of the present invention.
Figure 8B:
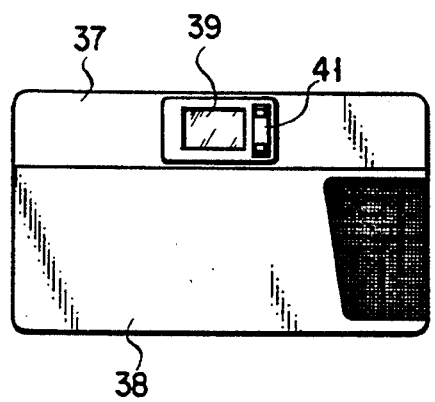
FIG. 8B shows the rear view of the camera of FIG. 8A.

With the above structure, an output signal from the human body detecting circuit 41 is supplied to a CPU 5 (FIG. 7) whenever the photographer 40 looks into the finder (see FIG. 8A).

A range finding circuit, a circuit for sensing a signal from a remote controller, and an eye-sensing circuit are examples of detection circuits that utilize infrared rays. Where the camera contains these structural elements, either part or the whole of them can be used as a human body detecting circuit. If this is done, the camera can be reduced in size, and the manufacturing cost thereof can be reduced.

Figure 10A:
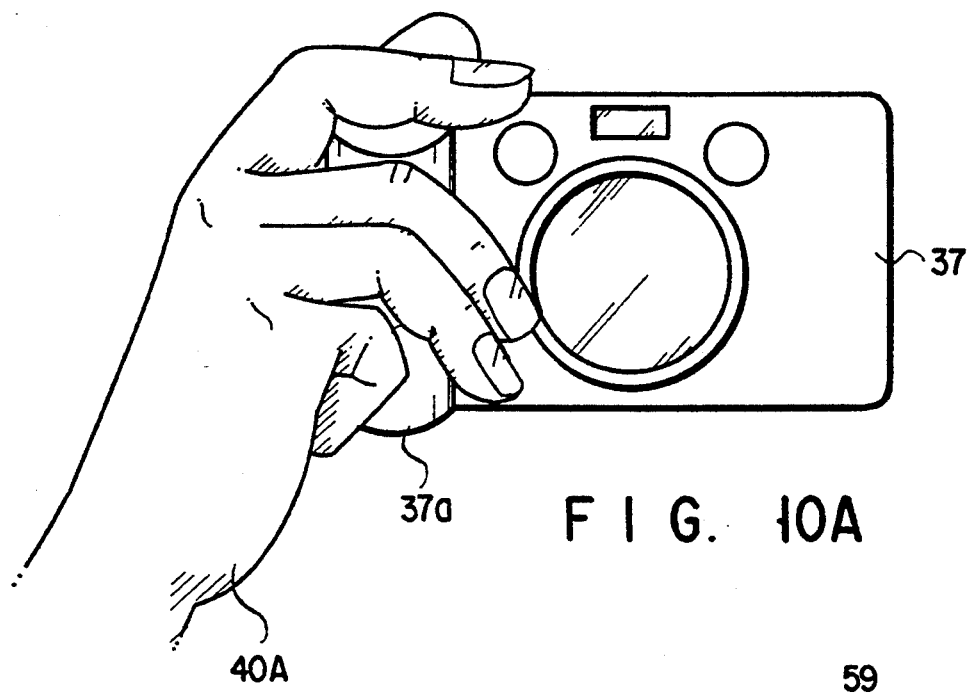
FIG. 10A shows a photographer gripping a camera.
Figure 10B:
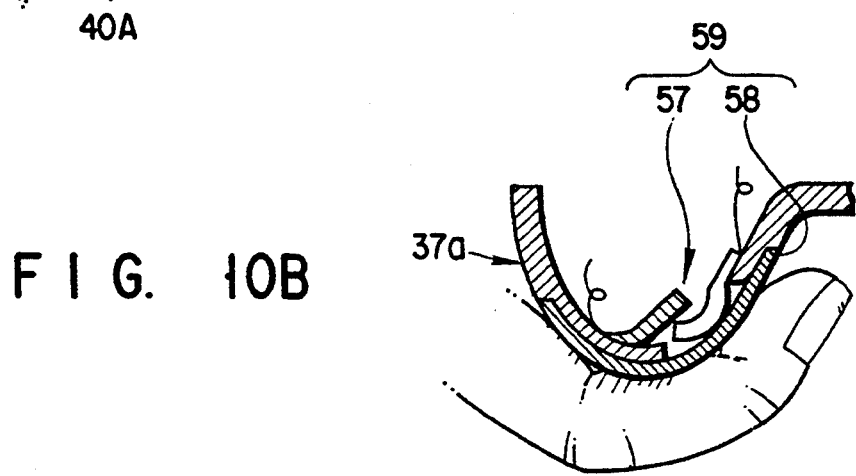
FIGS. 10B and 10C shows examples of a grip switch.

FIGS. 10A and 10B show a grip switch employed in the second embodiment of the present invention. The grip switch is provided for the camera 37 (FIG. 10A) and is located at a position where it can detect the photographer's action of holding or gripping the camera 37. To be more specific, the grip switch is located on the grip portion 37a which is to be held by the right hand 40A of the photographer, as is shown in FIGS. 10A and 10B.

The photographer may be left-handed or may hold the camera 37 in a different manner from that shown in FIG. 10A. For reliable detection of the state where the camera is held by the photographer, a plurality of grip switches may be provided for the camera such that any one of them can detect the camera being held by the photographer.

Figure 10C:
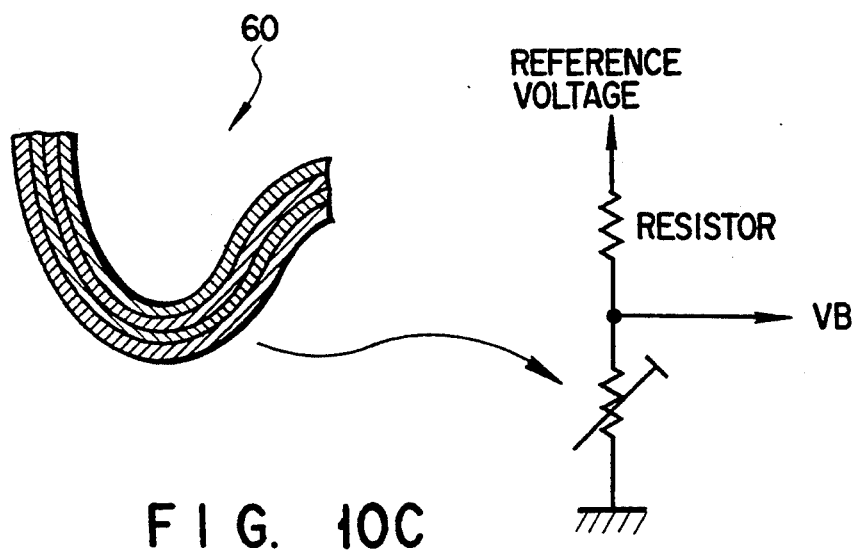

FIGS. 10B and 10C each show a specific example of a grip switch. The grip switch 59 shown in FIG. 10B is covered with an elastic member 58 such that a mechanical contact 57 (which is a known type) can be operated externally. The grip switch 60 shown in FIG. 10C comprises a pressure sensor, and the resistance thereof varies in accordance with the gripping pressure applied thereto. The grip switch 60 outputs a signal when its resistance exceeds a predetermined threshold level. To be more specific, divided voltage VB is subjected to A/D conversion by an A/D converter contained in the camera 37, and a digital signal, thus obtained, is compared with a predetermined value, thereby determining whether or not the voltage VB exceeds the predetermined voltage value, and consequently whether the resistance of the grip switch 60 exceeds a corresponding predetermined resistance value. If the resistance of the grip switch exceeds the predetermined value, this means that the camera (grip switch 60) is being gripped by a photographer.

The operation of the embodiment shown in FIG. 7 will be described in detail, referring to the flowchart in FIG. 11. First, in step S0, CPU 5 checks the state of the grip switch. If the grip switch is OFF, CPU 5 is kept in the stand-by state. When the grip switch is turned on (indicating gripping of the camera by the user), the flow advances to step S1 wherein CPU 5 checks whether or not the finder of the camera is being looked through (i.e. whether a photographer is looking through the finder as in FIG. 8A). If the finder is not being looked through, the flow returns to step S0; if the is being looked through, CPU 5 sets the range finding device 12 in the enable state and lights the IRED 9 immediately, so as to perform a first range finding operation. Thereby, a first range value $1/l_0$ is obtained (step S2).

The embodiment shown in FIG. 7 differs from that shown in FIG. 1 only in that the human body detecting circuit switch means 41, which is capable of detecting whether or not the grip is held and whether or not the finder is looked through, is employed in place of the first switch means shown in FIG. 1. The human body detecting circuit switch means 41 may be designed such that it detects only one of the two states (i.e., either the state where the grip is held or the state where the finder is looked through). However, since a certain amount of energy is consumed for operating the human body detecting circuit 41, it is preferable that the human body detecting circuit 41 be operated in response to the detection of two states (i.e., in response to the state where both the grip is held and the finder is looked through) or the detection of more than two states. If this is done, the human body detecting circuit 41 is prevented from being undesirably actuated when the camera is contained in a case or other carrying box or bag. In the case where the human body detecting circuit 41 is of a type which operates in response to the detection of only one state, it is preferable that the human body detecting circuit 41 be designed to be turned off unless the camera is operated for a predetermined period of time.

In step S3 the timer means incorporated in CPU 5 starts a time measurement, and in step S4 the state of the second switch 3 is checked. If the second switch 3 is ON in step S4, the flow advances to step S5; if not, the flow jumps to step S10.

In step S10, it is determined whether or not 300 msec has elapsed from the start of the time measurement. If 300 msec has not yet elapsed, the flow returns to step S4; if 300 msec has elapsed, the flow returns to step S0.

Since the other steps (namely, steps S5–S9) are similar to those shown in FIG. 2, a description of them will be omitted here.

As is understood from the above, the embodiment shown in FIG. 7 differs from that shown in FIG. 1, only in that the human body detecting circuit 41 is provided in place of the first switch 1 and a range finding operation is conducted and is preferably repeated at the intervals of 300 msec. The 300 msec timing is performed in the CPU 5. Time periods other than 300 msec can be used, but 300 msec is preferred. Except for the structural elements and steps which are related to these differences, the structural elements and control flows used in the embodiment shown in FIG. 7 are similar to those used in the embodiment shown in FIG. 1. Accordingly, the correspondences between the control flows are indicated below, and a repeated description will be omitted.

Figure 6:
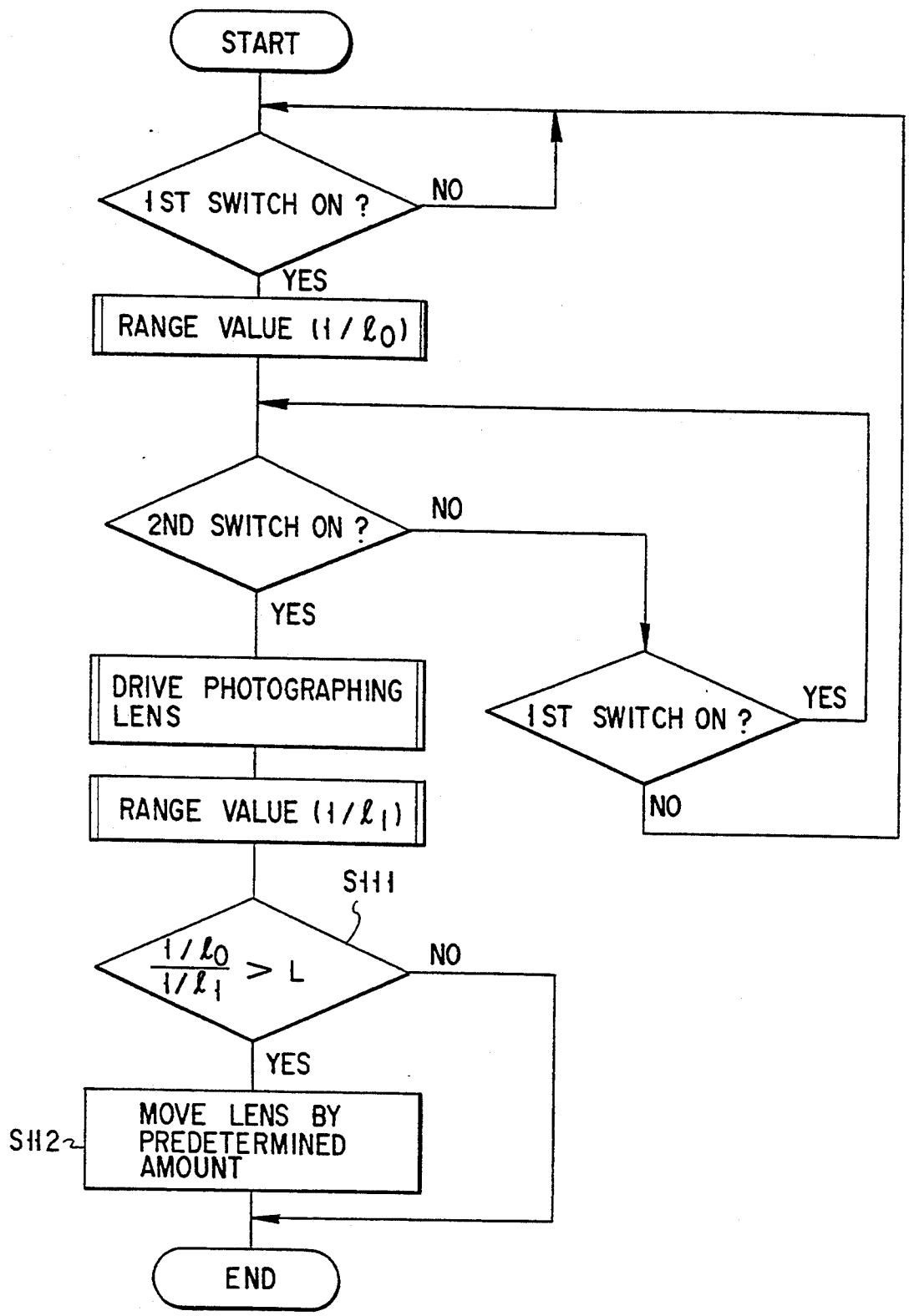
FIG. 6 is a flow chart for illustrating a modification of the embodiment shown in FIG. 3.
Figure 11:
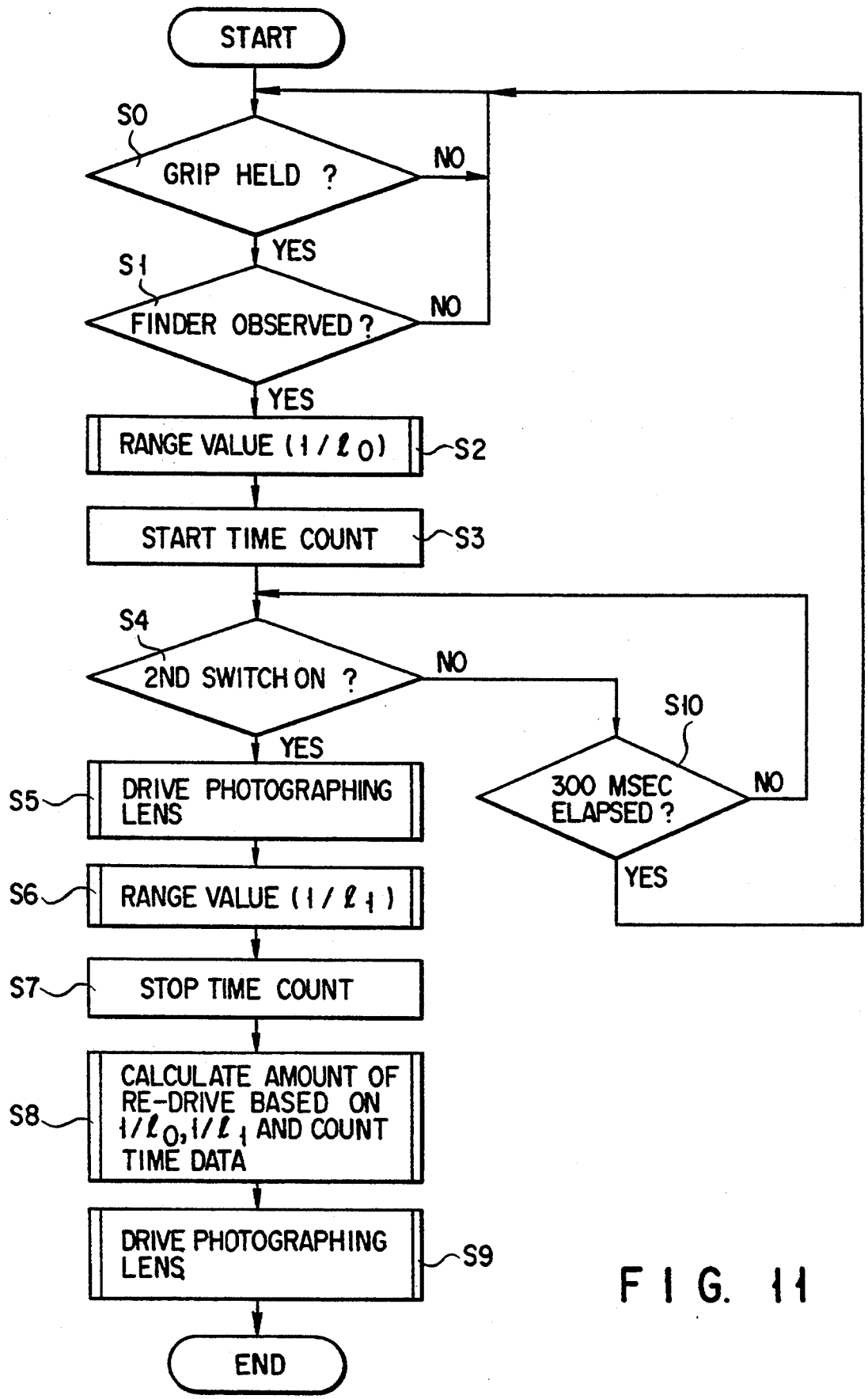
FIGS. 11, 12, 13, 14, 15 and 16 are flowcharts for explaining the operation of the embodiment shown in FIG. 7.
Figure 12:
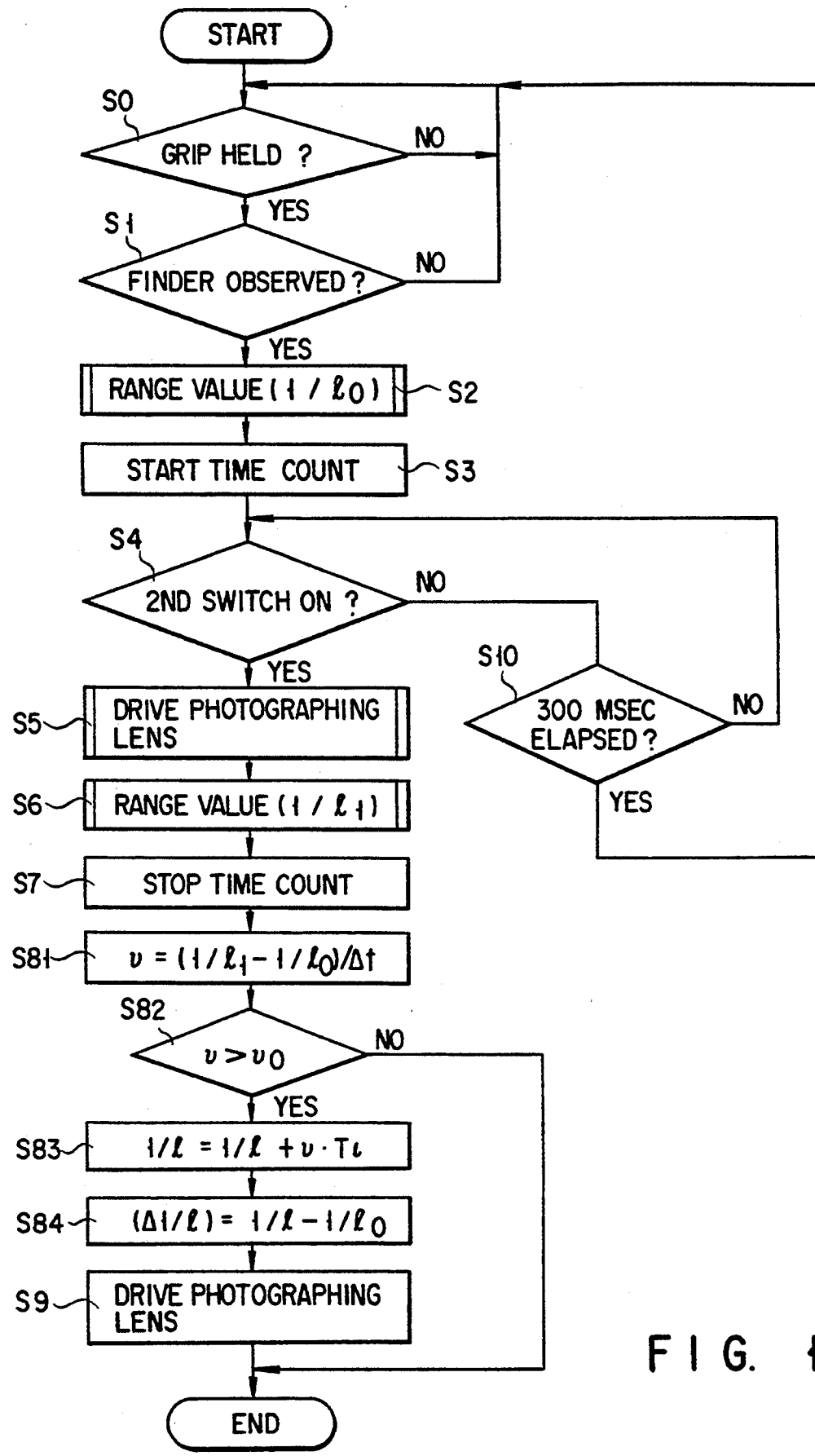
Figure 13:
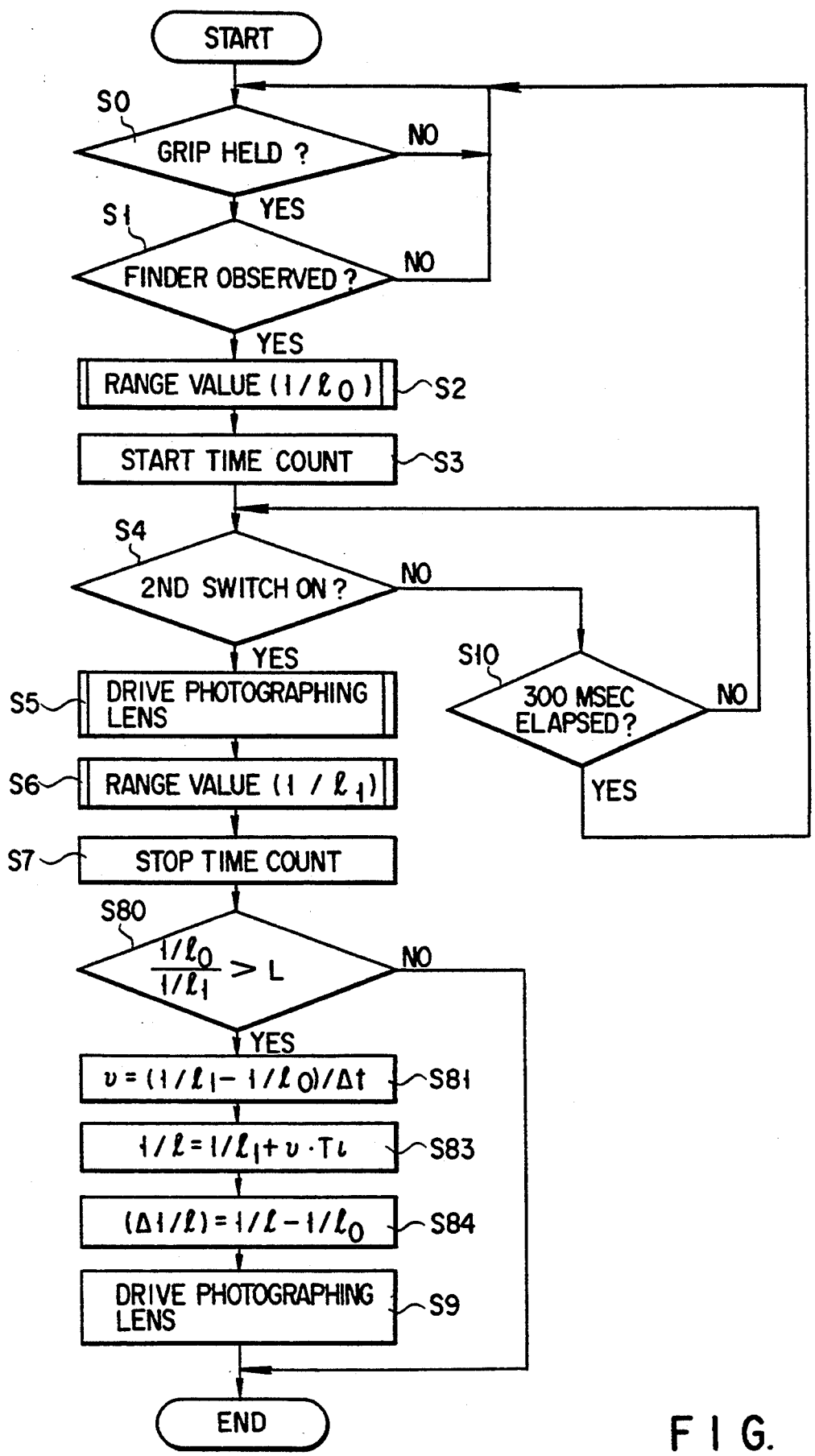
Figure 14:
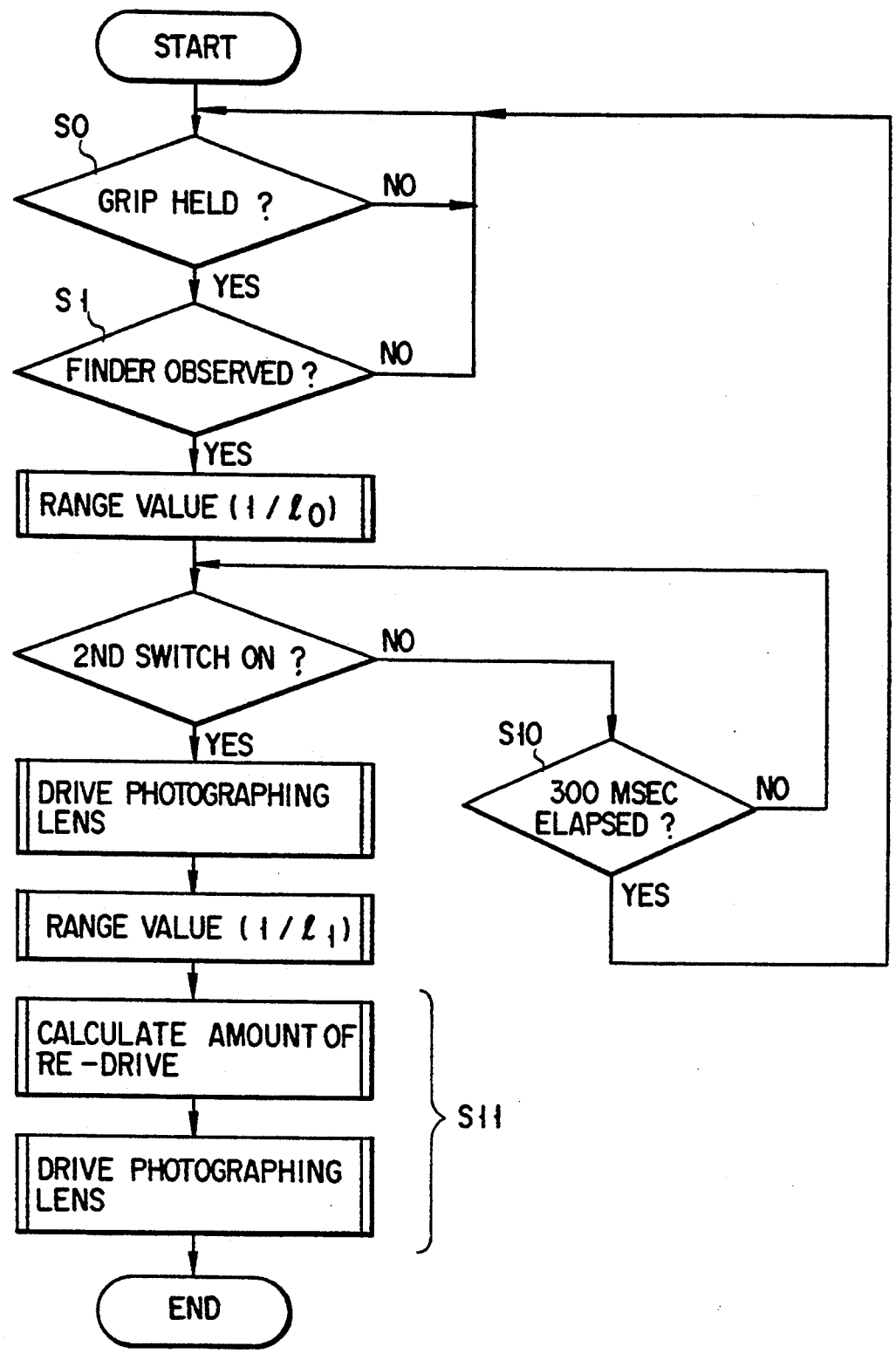
Figure 15:
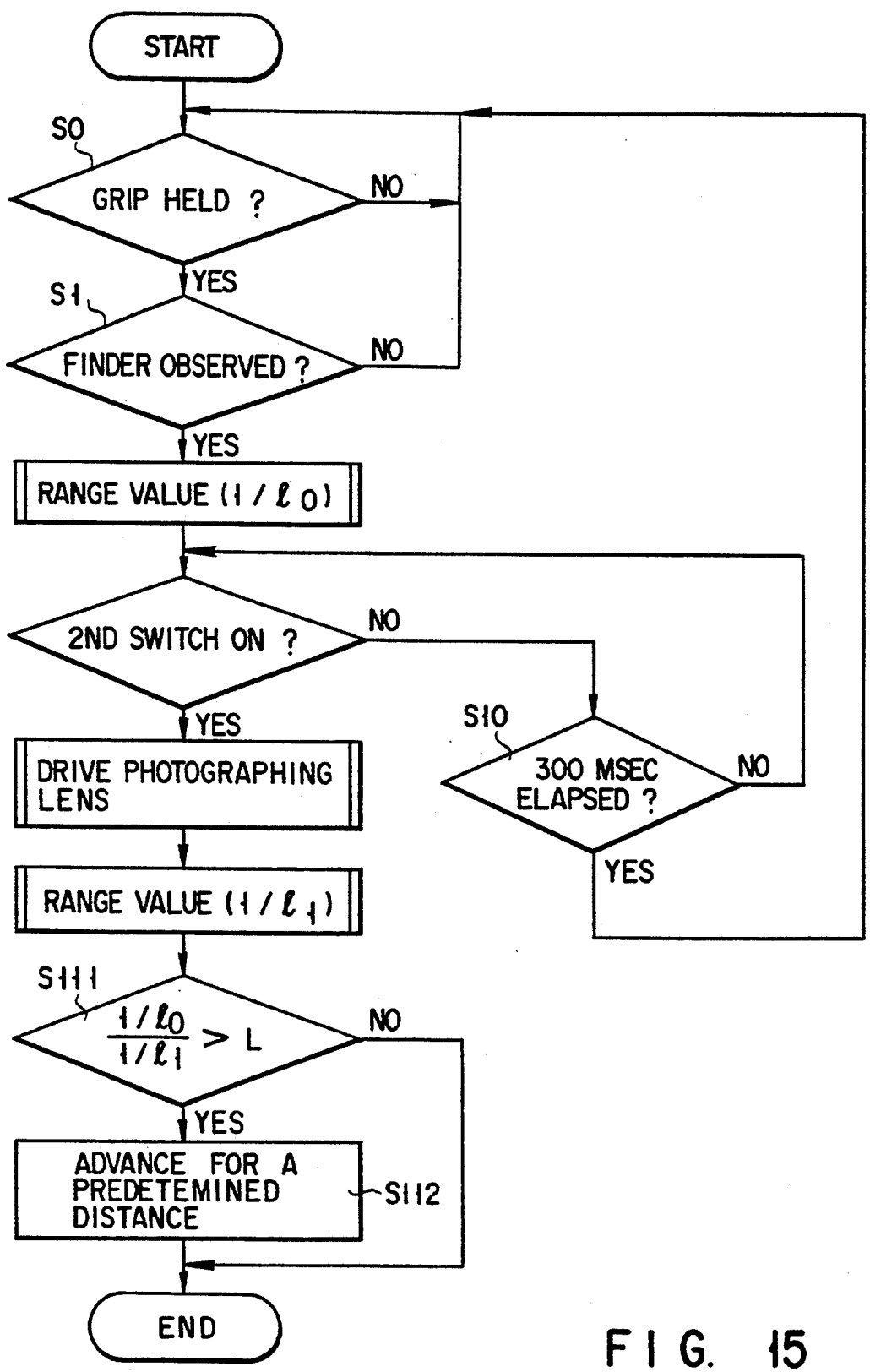
Figure 16:
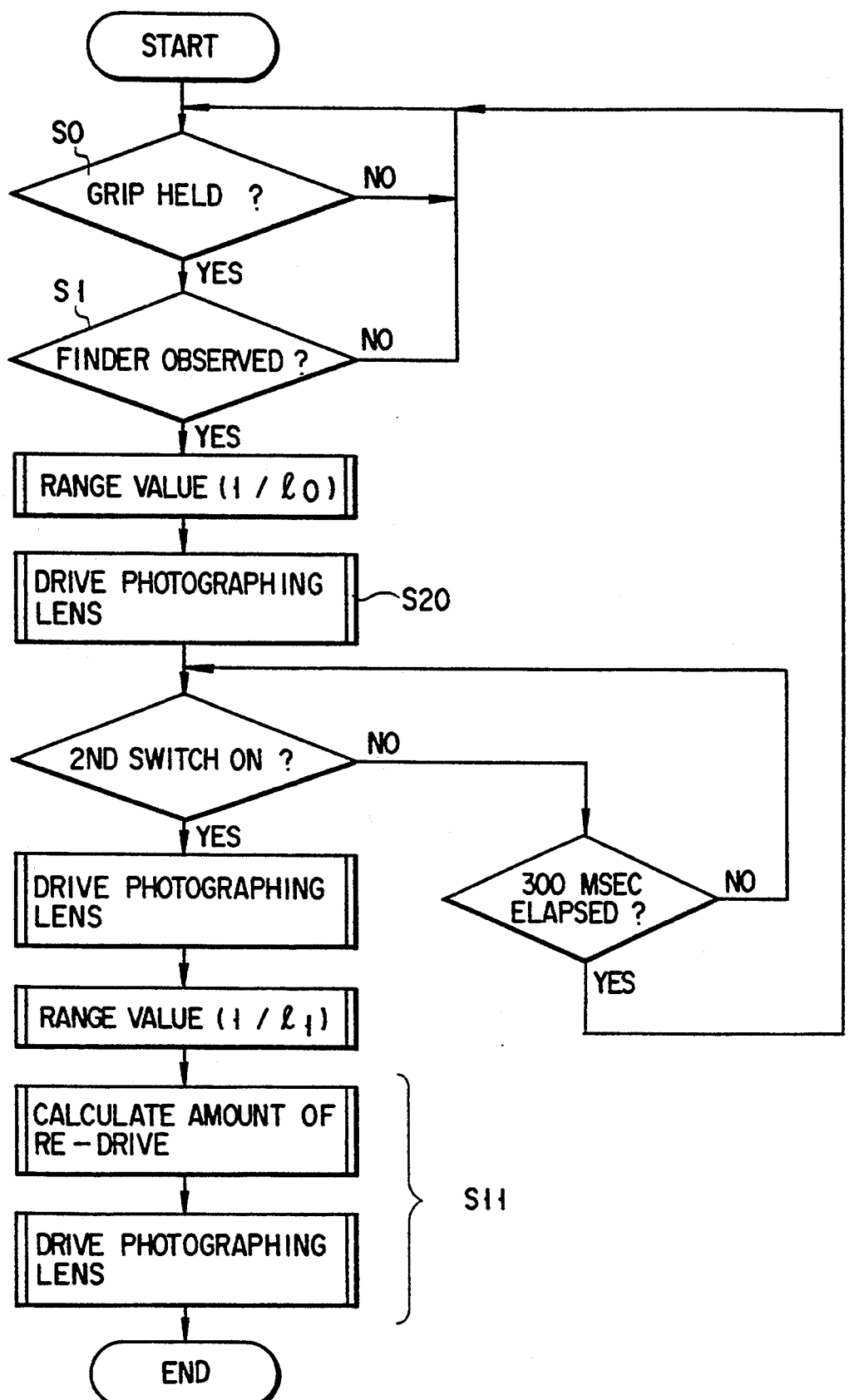
Figure 17A:
FIGS. 17(a)-(17e) show signal waveforms at respective points (a)-(e) in FIG. 9.
Figure 17B:
Figure 17C:
Figure 17D:
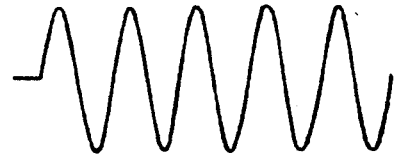
Figure 17E:

FIG. 2→FIG. 11
FIG. 3→FIG. 12
FIG. 4→FIG. 13
FIG. 5→FIGS. 14 and 16
FIG. 6→FIG. 15

The embodiment shown in the flowchart of FIG. 16 is similar to that of FIG. 11, except that not only is a range finding operation conducted, but also the driving of a lens is executed at the intervals of 300 msec.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An autofocus camera comprising:
   a photographing lens which is electrically driven;
   range finding means for emitting a pulse beam to an object and receiving a reflection beam from the object, and for outputting a signal representing the distance to the object;
   first range finding operation control means, responding to half-depression of a release button, and for activating the range finding means to obtain a first range output;
   first drive control means for responding to full-depression of the release button, and for driving the photographing lens on the basis of the first range output from the first range finding operation control means, thus performing a first lens driving operation;
   second range finding operation control means for activating the range finding means to obtain a second range output either before or after the first lens driving operation by the first drive control means is completed;
   timer means for measuring a time interval between a time point of the first range finding operation by the range finding means and a time point of the second range finding operation by the range finding means, thereby outputting count time data; and
   second drive control means for estimating the distance to the object at the time of operating a shutter, on the basis of the first range output and second range output from the range finding means and the count time data from the timer means, and for re-driving the photographing lens.

2. The camera according to claim 1, wherein said second drive control means includes:
   velocity calculating means for calculating the velocity of the object on the basis of the first range output, the second range output and the count time data;

estimation means for estimating the distance to the object at the time of operating the shutter, on the basis of the second range output and the calculated velocity, and for thereby outputting estimated distance data;

re-drive amount calculating means for calculating the re-drive amount of the photographic lens from the estimated distance data from the estimation means; and re-driving means for re-driving the photographing lens in accordance with the re-drive amount calculated by the re-drive amount calculating means.

3. The camera according to claim 2, wherein said second drive control means further includes:

comparing means for comparing the velocity calculated by the velocity calculating means with a reference value; and prohibiting means for prohibiting the re-drive by the re-driving means when the velocity is lower than a predetermined value.

4. The camera according to claim 1, wherein said second drive control means includes means for comparing the first and for second range outputs, and determining whether or not the re-drive should be performed.

5. An apparatus for controlling the focus in a camera, comprising:

beam-emitting means for emitting a pulse beam to an object;

timing signal generating means for generating a first timing signal in response to depression of a release button, and for generating a second timing signal in response to driving of a photographing lens;

output means for outputting an output signal representing a time interval between the first and second timing signals generated from the timing signal generating means;

range finding means for receiving a reflection pulse beam from the object and for calculating the distance to the object on the basis of the first and second timing signals from the timing signal generating means; and lens drive control means for initially driving the photographing lens on the basis of the distance to the object, which has been calculated by the range finding means on the basis of the first and second timing signals from the timing signal generating means, and for further driving the photographing lens on the basis of the distance to the object, which has been calculated by the range finding means on the basis of the first and second timing signals, and the output signal from the output means.

6. The apparatus according to claim 5, wherein said timing signal generating means includes means for generating the second timing signal either just after or just before the initial driving of the photographing lens is completed.

7. A method of controlling the focus in a camera, comprising the steps of:

performing a first range finding operation in response to depressing of a shutter release button;

initially driving a photographing lens on the basis of the result of the first range finding operation;

performing a second range finding operation either just after or just before the initial driving of the photographing lens is completed;

estimating the distance to an object at the time of operating a shutter, on the basis of the result of the first range finding operation, the result of the second range finding operation and the time interval between the first and second range finding operations; and re-driving the photographing lens in accordance with the estimated distance.

8. An autofocus camera comprising:

a photographing lens which is electrically driven;

range finding means including means for emitting a pulse beam to an object, means for receiving a reflection beam from the object, and means for finding a distance to the object;

first range finding operation control means responding to the operation of a manual switch, and for activating the range finding means for obtaining a first range output;

driving means for driving the photographing lens on the basis of the first range output from the first range finding means;

second range finding operation control means for activating the range finding means to either just after or just before the driving of the photographing lens by the driving means is completed, for thereby obtaining a second range output; and re-driving means for re-driving the photographing lens on the basis of at least the first range output and second range output from the range finding means.

9. The apparatus according to claim 8, wherein said re-driving means includes means for re-driving the photographing lens in accordance with the difference between the first and second range outputs.

10. The apparatus according to claim 8, wherein said re-driving means includes comparing means for comparing the first and second range outputs, and prohibiting means for re-driving the photographing lens by a predetermined amount when it is determined from the comparison result that the object is moving, and prohibiting the re-driving when it is determined that the object does not move.

11. An autofocusing method for an autofocusing apparatus wherein a range finding beam is emitted to an object, a reflection beam from the object is received to calculate the distance to a object, and a focus of a photographing lens is adjusted on the basis of the calculated distance, said method further comprising the steps:

performing a first range finding operation in response to a manual operation;

performing a first photographing lens driving operation on the basis of object distance data obtained by the first range finding operation;

performing a second range finding operation either just after or just before the driving of the photographing lens is completed; and performing a second photographing lens driving operation on the basis of at least first and second range data obtained by the first and second range finding operations.

12. A method of controlling the focus in a camera, comprising the steps of:

performing a first range finding operation in accordance with depression of a shutter release button;

initially driving a photographing lens in accordance with the result of the first range finding operation;

performing a second range finding operation just after or just before the initial driving of the photographing lens is completed; and re-driving the photographing lens on the basis of first and second range data obtained by the first and second range finding operations.

13. An autofocus camera comprising:
a photographing lens which is electrically driven;
range finding means for emitting a pulse beam to an object and receiving a reflection beam from the object, and for outputting a signal representing the distance to the object;
first range finding operation control means, actuated in response to a photographing-preparing operation, for activating the range finding means to obtain a first range output;
first drive control means for responding to the operation of a release button, and for driving the photographing lens on the basis of the first range output from the first range finding operation control means, thus performing a first lens driving operation;
second range finding operation control means for activating the range finding means to obtain a second range output either before or after the first lens driving operation by the first drive control means is completed;
timer means for measuring a time interval between a time point of the first range finding operation by the range finding means and a time point of the second range finding operation by the range finding means, thereby outputting count time data; and
second drive control means for estimating the distance to the object at the time of operating a shutter, on the basis of the first range output and second range output from the range finding means and the count time data from the timer means, and for re-driving the photographing lens.

14. An apparatus for controlling the focus in a camera, comprising:
beam-emitting means for emitting a pulse beam to an object;
timing signal generating means for generating a first timing signal in response to a photographing-preparing operation, and for generating a second timing signal in response to driving of a photographic lens;
output means for outputting an output signal representing a time interval between the first and second timing signals generated from the timing signal generating means;
range finding means for receiving a reflection pulse beam from the object and for calculating the distance to the object on the basis of the first and second timing signals from the timing signal generating means; and
lens drive control means for initially driving the photographing lens on the basis of the distance to the object, which has been calculated by the range finding means on the basis of the first and second timing signals from the timing signal generating means, and for further driving the photographing lens on the basis of the distance to the object, which has been calculated by the range finding means on the basis of the first and second timing signals, and the output signal from the output means.

15. A method of controlling the focus in a camera, comprising the steps of:
performing a first range finding operation in response to a photographing-preparing operation;
initially driving a photographing lens on the basis of the result of the first range finding operation;
performing a second range finding operation either just after or just before the initial driving of the photographing lens is completed;
estimating the distance to an object at the time of operating a shutter, on the basis of the result of the first range finding operation, the result of the second range finding operation and the time interval between the first and second range finding operations; and
re-driving the photographing lens in accordance with the estimated distance.

16. An autofocusing apparatus comprising:
a photographing lens which is electrically driven;
range finding means including means for emitting a pulse beam to an object, means for receiving a reflection beam from the object, and means for finding a distance to the object;
first range finding operation control means, actuated in response to a photographing-preparing operation, for activating the range finding means for obtaining a first range output;
driving means for driving the photographing lens on the basis of the first range output from the range finding means;
second range finding operation control means for activating the range finding means either just after or just before the driving of the photographing lens by the driving means is completed, for thereby obtaining a second range output; and
re-driving means for re-driving the photographing lens on the basis of at least the first range output and second range output from the range finding means.

17. A method of controlling the focus in a camera, comprising the steps of:
performing a first range finding operation in accordance with a photographing-preparing operation;
initially driving a photographing lens in accordance with the result of the first range finding operation;
performing a second range finding operation just after or just before the initial driving of the photographing lens is completed; and
re-driving the photographing lens on the basis of first and second range data obtained by the first and second range finding operations.

18. An automatic focus control method wherein a measurement beam is emitted to an object, a distance to the object is calculated in accordance with a light beam reflected by the object, and a focus control of a photographing lens is performed on the basis of the calculated distance, said method further comprising the steps of:
repeatedly executing a first range finding operation in response to a photographing-preparing operation;
initially driving the photographing lens on the basis of object data obtained as a result of the first range finding operation;
executing a second range finding operation just after or just before the driving of the photographing lens is completed; and
further driving the photographing lens on the basis of at least one of first range finding data and second range finding data.

* * * * *